United States Patent [19]

Pugh

[11] 4,343,665
[45] Aug. 10, 1982

[54] METHOD FOR MANUFACTURING SF6 PRESSURIZED GAS CONTINUOUS SPACER CABLE

[76] Inventor: Paul F. Pugh, 4082 Sequoyah Rd., Oakland, Calif. 94605

[21] Appl. No.: 67,062

[22] Filed: Oct. 15, 1979

[51] Int. Cl.³ .................. H01B 13/08; H01B 17/36
[52] U.S. Cl. ................................. 156/48; 29/857; 29/870; 156/56; 156/145; 156/188; 156/195; 156/285; 174/15 C; 174/25 G; 174/26 G; 174/DIG. 7
[58] Field of Search ................. 156/48, 53, 56, 145, 156/184, 185, 187, 188, 190, 191, 192, 195, 285; 174/15 C, 24, 25 R, 25 G, 26 R, 26 G, 27, DIG. 7; 29/624, 628, 630 R, 630 A, 630 F, 599, 857, 870

[56] References Cited

U.S. PATENT DOCUMENTS

| | | | |
|---|---|---|---|
| 3,403,063 | 9/1968 | Walker | 156/48 |
| 3,608,710 | 9/1971 | Pugh | 174/11 BH X |
| 3,613,231 | 10/1971 | Pugh | 174/15 C X |
| 3,721,002 | 3/1973 | Pugh | 29/628 |
| 4,092,485 | 5/1978 | Wanser | 174/28 |

OTHER PUBLICATIONS

Shanklin, G. B. "Low-Gas-Pressure Cable", Electrical Eng'g. Transactions (IEEE), Jul. 1939, pp. 1-12.

*Primary Examiner*—Edward C. Kimlin
*Assistant Examiner*—Robert A. Dawson

[57] ABSTRACT

This invention relates to a new method for manufacturing a SF6 pressurized gas continuous spacer cable, and improvements which reduce costs and improve quality control of high voltage cables. The conductor is passed through taping machines for surrounding the conductor with a continuous insulating spacer and through taping machines for applying a conducting shielding material which partially covers the spacer. The insulated and shielded cable is continued on in the same production line into conduit which is laid out horizontal in long lengths or is extruded loose-fit over the cable. The cable is then subjected to vacuum while in the conduit. Terminations are applied. Seals are tested for leaks. The cable is filled with SF6 gas to a high pressure. The cable is tested at 1.5 times its operating voltage to ground for 30 minutes without failure.

2 Claims, 3 Drawing Figures

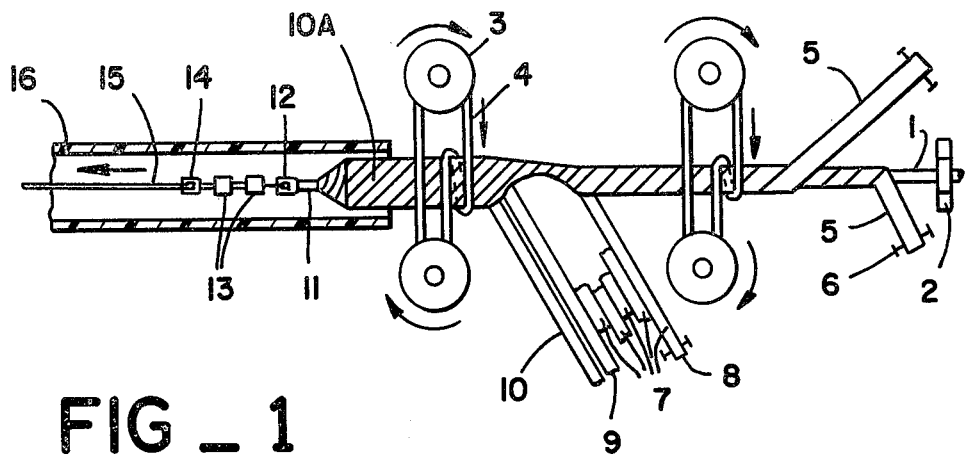
FIG_1
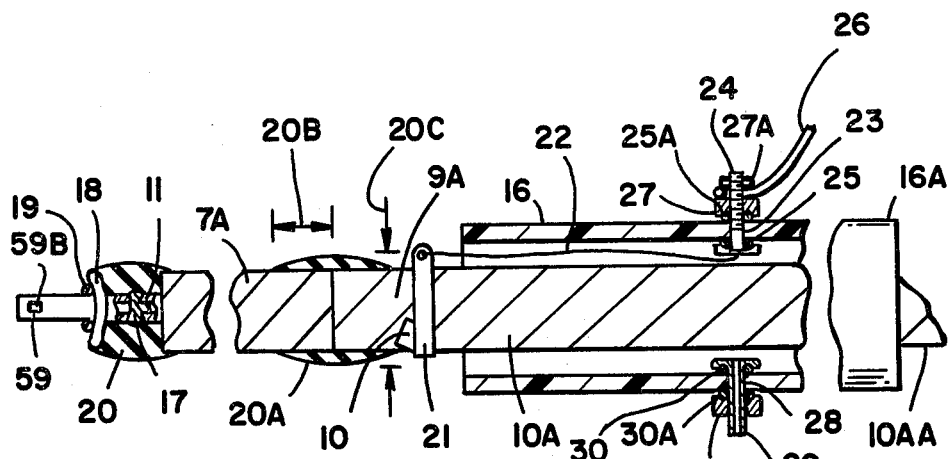
FIG_2
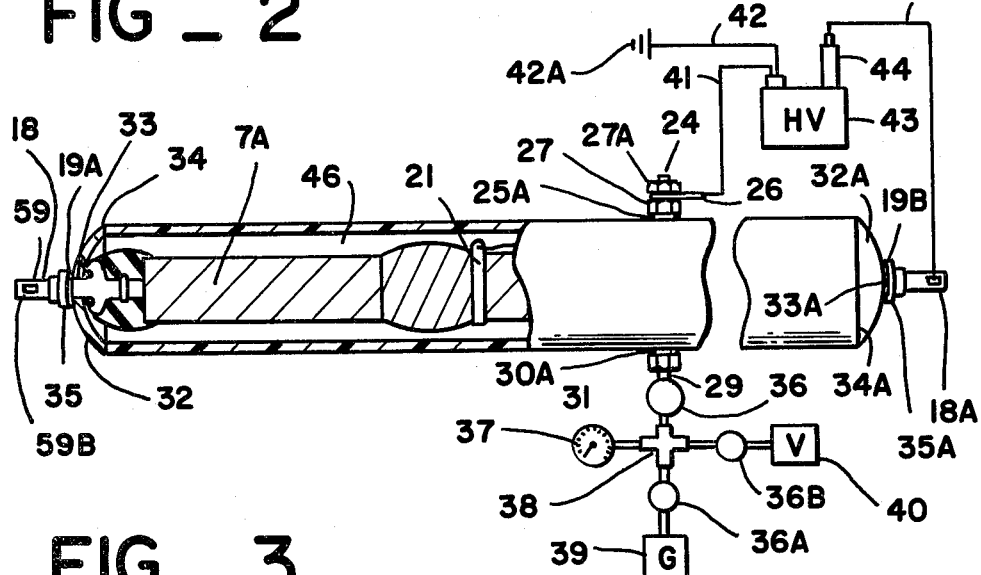
FIG_3

METHOD FOR MANUFACTURING SF$_6$ PRESSURIZED GAS CONTINUOUS SPACER CABLE

BRIEF SUMMARY OF THE INVENTION

This invention relates to new methods for manufacturing coilable insulated cables. Present insulated cables are manufactured by extruding rubber-like materials over conductors or by wrapping tapes around conductors, both of which may be shielded and sheathed for mechanical protection. These cables are typically reeled, factory tested, shipped to the field for installation and terminating. The factory testing of these cables is not accomplished with the final permanent terminations. The factory testing of these cables entails special instrumentation such as ionization and corona levels or power factor measurements at high voltage to determine the ionization factor for such cables as paper/oil or paper/oil/gas cables.

The new method for making cables in gaseous insulation and paper without the oil. Gaseous insulation or SF$_6$ gas spacer cable has been produced by using partial spacers to separate the conductor and shield or sheath. The new method is a continuous spacer of dry paper and very low density. Moisture is easy to remove by subjecting to vacuum and the corona resistance of the paper is very poor which is used to advantage in testing the cable for corona or ionization by the application of a high alternating voltage for a long period of time. If ionization takes place during the test, the cable will fail in a few minutes to seconds due the poor corona resistance of the continuous spacer and the fact that SF$_6$ pressurized gas has the same value for breakdown voltage as ionization level voltage when the pressure is 40 psig or higher.

The operating life of high voltage insulated cables has a direct bearing on the ionization voltage of the insulation. If ionization takes place at operating voltage, all organic insulations will fail in a few months to several years at low intensities. Extruded insulations have a very high breakdown voltage and a very low ioniztion voltage due to the air pockets. Paper/oil cables may have air pockets which can ionize. The mobile oil does tend to flow into the pockets and stop ionization at low levels. When the oil is pressurized or when the excess oil is drained and the cable is pressurized with an insulating gas, ionization is under control by the pressure. The ionization voltage is directly related to the pressure. The higher the pressure, the higher the voltage at which ionization can occur. The unique aspect of this invention is a method for making cables wherein the insulation makes it easy to determine and monitor the ionization level of the cable by the application of the conventional hi-pot test for a longer period of time. In the past, the hi-pot test was performed for a short time to make certain no corona damage took place. Additional testing was necessary for determination of corona level at operating voltage.

The manufacturing process and testing of cable has always been separated from the final installed cable with terminations. This invention provides a methods for eliminating the expense of separate test at the factory without the final terminals. The final terminals and conduit are attached and tested.

The manufacturing process permits the manufacture of large conductors and long lengths for energy conservation. The continuous spacer is wound with a half lap, randomly, compared to conventional paper/oil cables which are wound with precision with a butt wrap and without registration.

Conventional paper/oil cables are vacuum treated in large tanks and impregnated with de-gasified oil. The investment in equipment and space are both very large. The new method uses the conduit for treating of the paper. Impregnation is simple and fast as the gas penetrates the low density paper immediately.

The simplified new methods are related to the cellulose structure of the continuous paper spacer. The cellulose fibres are hollow whereas synthetic fibres and papers are solid. Solid materials would not be penetrated rapidly by the gas and would lead to potential low pressure spots which could ionize and fail under voltage over a period of time. The natural fibre is easily penetrated and pressurized inside and outside.

Conventional SF$_6$ gas cables with non-continuous spacers are very difficult to operate and test if any particles or impurities are present or if condensation takes place on a spacer. A failure in the cable usually results in extensive clean-out work to remove metals and carbon. The continuous spacer cable is easier to manufacture as normal precautions of cleanliness are adequate. The continuous spacer screens and prevents the floatation of conducting particles and tends to absorb condensation with ends free of moisture, the only surface for flashover.

A BRIEF DESCRIPTION OF DRAWINGS

FIG. 1 is a schematic of a method for twisting aluminum tapes, crepe paper tapes, and aluminum shielding tapes into a completed cable by rubber belts which revolve the tapes about a stationary steel rod. The completed cable is pushed off the rod and is spiraled into the polyethylene pipe in one continuous operation. It can be designed for continuous operation as the machine does not need to be shut down to splice in new lengths of tapes.

FIG. 2 is a schematic of the additional manufacturing steps for the continuous spacer gas pressurized cable. The conduit is sealed where the conduits at ends leaves the conduit and where the shield is grounded. The shield is end prepared and necessary fittings are attached to treat, add gas, and test.

FIG. 3 shows the completed cable with terminations being testing for dielectric strength and ionization. Note the loose fit cable in the conduit which acts to hold pressure and acts as the termination. Fittings are shown for treating and pressurizing the cable in its own conduit.

DESCRIPTION OF THE PREFERRED METHOD

A detailed description of the drawings is now offered. In FIG. 1, a stationary steel rod 1 sized for intended conductor is supported by collar 2 which is part of structure for supporting drive wheels 3 which are generally driven by belts, gears, and an electric motor with the necessary controls. A soft rubber belt 4 is twisted about rod 1 and drive wheels 3 to impart a twisting action on surface of rod 1. An aluminum tape 5 sized for intended conductor is positioned on a payoff reel 6. Tape 5 is hand wound around rod 1 under rubber belt 4. First drive wheel 3 is started in direction shown which twists tape 5 into spiral aluminum tube conductor 11 which travel to left. Crepe paper tapes 7, the number selected for intended cable, are mounted on reels 8, are hand twisted about conductor 11. Perforated aluminum shielding tape 9 is hand twisted around crepe paper taped cable 7A. Grounding aluminum tape or wire 10, sized for cable short circuit rating, is hand twisted around shielded cable 9A. Drive wheel 3 is started, which twists tapes 5,7,9, and 10 into an insulated cable 10A.

The conductor 11 of cable 10A is attached to a pulling eye 12, swivel 13, eye 14 and pulling rope 15, which is propelled by motive power or winch through insulating pipe 16. The twisting action of belt 4 will aid pushing of cable 10A into pipe 16. Pulling rope 15 aids the movement of cable 10A into pope 16 in long lengths and when pipe 16 is coiled or reeled.

After cable 10A is through pipe 16 proper distance, drive 3 is stopped. Cable 10A is cut off proper distance. Cable and pipe 16 is moved and another section of pipe is positioned and the operation is repeated.

FIG. 2 is a section pipe 16 with cable 10A inside which shows the aluminum tube conductor 11 exposed the proper length. A bi-metallic (copper to aluminum) terminal fitting 18 is attached to conductor 11 by weldment 17. Grounding tape 10 and shield tape 9 are removed proper distance for intended voltage from end of cable 7A. Ground tape 10 is cut off at ground clamp 21. Shield tape 9 is cutoff square at center of stress cone 20A and is held in place by stress cone 20A. Stress cone 20A is made by hand wrapping crepe paper tape 7 about cable 7A and cable 9A for proper distance 20B and proper thickness 20C for intended voltage. End tape seal 20 is made by hand wrapping crepe paper tapes 7 about conductor 11, cable 7A, and terminal stud 18.

Prior to the insertion of cable 10A into pipe 16, metallic grounding fittings 24 and metallic or non-magnetic treating and pressurizing pipe 29 are installed in pipe 16 as needed. Holes 23 and 28 are drilled into pipe 16 and sized as needed. Aluminum ground wire 22, of proper length, is welded to ground fitting 24. Rubber O-ring 25A is positioned over fitting 24. Locknut 27 is screwed tight on fitting 24 which compresses O-rings 25 and 25A against pipe 16, providing a gas tight seal. Fitting 29, with rubber O-ring 30 in place, is inserted into hole 28 from within pipe 16. Rubber O-ring 30A is positioned over fitting 29. Locknut 31 is screwed on pipe fitting 29 to compress O-ring 30 and 30A against pipe 16 providing a gas tight seal.

Ground clamp 21 is attached to one end of cable 10A, which is extended from pipe 16 proper distance for intended voltage of cable 10A. Ground wire 22 is welded to clamp 21 and has proper length.

Rubber O-ring 19 is positioned on stud 18. Cable 10A, stress cone 20A, and terminal 19 are inserted into pipe 16 the proper distance, to permit a repeat of described work at second end of pipe 16A and cable 10AA.

In FIG. 3, end caps 32 and 32A have holes 33 and 33A drilled in center through which terminal studs 18 and 18A are inserted. Caps 32 and 32A are positioned against pipe ends 16 and 16A. Plastic welds 34 and 34A are made for gas tight seals.

O-rings 19A and 19B are positioned on studs 18 and 18A. Locknuts 35 and 35A are screwed on studs 18 and 18A to compress O-rings 19,19A, and 19B against caps 32 and 32A for a tight gas seal and to anchor cable 10A to pipe 16. The pipe 16 can then be anchored, which anchors the cable by the conductor in the pipe to restrict movement or for elevation changes to prevent conductor movement inside of the pipe.

Valves 36, 36A, and 36B, pressure and vacuum gauge 37, gas tank 39, and vacuum pump 40 are attached to pipe fitting 29. Dry compressed air or dry nitrogen is applied to pipe seals at twice the intended operating pressure for 15 minutes without leaks. Cable is treated in usual manner by removing air and moisture from within pipe 16 and cable 10A with vacuum pump 40. Cable 10A may be heated through studs 18 and 18A by passing current through conductor 11 to aid the removal of moisture from crepe paper tapes 7. A direct current voltage and alternating current voltage test set 43 is applied to cable 10A from conductor 11 to shield 9 and across cable 7A ends from shield 9 under stress cone 20A to studs 18 and 18A.

$SF_6$ gas tank 39 is applied to pipe 16 and cable 10A by opening valve 36A. Tank 39, located opposite from vacuum pump 40 permits breaking the vacuum with $SF_6$ pressurized gas 46. Valve 36B is closed and pump 40 removed. Tank 40 is operated to pressurize pipe 16 from 40 to 80 pounds per square inch gauge pressure with $SF_6$ gas 46. Pressure will depend upon the voltage stress of cable 10A.

A high potential, 60 hertz voltage at 1.5 times cable 10A operating voltage to ground is applied for 30 minutes, without failure, is applied to conductor 11 through terminal 18A and ground stud 24. Ground wires 41 and 42 are connected to stud 24, to test set 43, and ground 42A. High voltage lead 45 is attached to test set 43, bushing 44, and stud 18A. Conductor 11 resistance and other conventional tests may be run as directed.

The new methods shown relate to methods for making a continuous spacer, gas pressurized cable, conduit, and terminations together with testing for quality control of the manufactured product. It is within the contemplated scope of this invention that numerous changes and variations can be made in the methods disclosed herein without departing from the intended scope of the invention. The manufacturing methods are applicable at a fixed location or shop or can be performed at the installation site with portable equipment. Very large, difficult to transport cables, conduits, and terminations would most likely be manufactured at the job site.

I claim:

1. A method for manufacturing a pre-finished continuous non-impregnated paper spacer gas pressurized cable, including a conduit and terminations, comprising the steps of:
   wrapping said continuous spacer around a conductor;
   wrapping a metallic electrical shielding material around said spacer;
   inserting said conductor, said spacer, and said shielding material into a fixed long length of non-metallic conduit;
   sealing said conduit at each end about said conductor to form said terminations;
   and then filling said conduit and said continuous spacer with said gas.

2. A method for manufacturing a pre-finished continuous non-impregnated paper spacer gas pressurized cable, including a conduit and terminations, according to claim 1 wherein the continuous, non-impregnated paper spacer is crepe paper and the gas is sulfur hexafluoride.

* * * * *